United States Patent [19]

Weeks

[11] Patent Number: 5,022,450
[45] Date of Patent: Jun. 11, 1991

[54] SAFETY TIRE AND TAKE-APART WHEEL CONSTRUCTION

[75] Inventor: J. Bruce Weeks, Eaton Rapids, Mich.

[73] Assignee: Motor Wheel Corporation, Lansing, Mich.

[21] Appl. No.: 432,163

[22] Filed: Nov. 6, 1989

[51] Int. Cl.$^5$ .................... B60B 25/04; B60C 17/04
[52] U.S. Cl. ............................. 152/381.6; 152/396; 152/427
[58] Field of Search ............... 152/379.3, 379.4, 379.5, 152/381.3, 381.4, 381.5, 381.6, 382, 383, 388, 389, 396, 399, 400, 516, 520, 415, 427

[56] References Cited

U.S. PATENT DOCUMENTS

| | | | |
|---|---|---|---|
| 3,280,879 | 10/1966 | Simms | 152/427 |
| 3,306,331 | 2/1967 | Citerniaen | 152/427 X |
| 4,258,767 | 3/1981 | Wilde | 152/520 X |
| 4,327,791 | 5/1982 | Strader | 152/520 X |
| 4,372,365 | 2/1983 | Osada et al. | 152/158 |
| 4,467,852 | 8/1984 | Ippen et al. | 152/325 X |
| 4,662,419 | 5/1987 | Winfield | 152/381.6 |
| 4,823,854 | 4/1989 | Payne et al. | 152/382 |

Primary Examiner—Russell D. Stormer
Attorney, Agent, or Firm—Barnes, Kisselle, Raisch, Choate, Whittemore & Hulbert

[57] ABSTRACT

A take-apart tire and wheel assembly including a multi-piece wheel rim having axially spaced bead flanges, a rim base, and a pneumatic tubeless tire, preferably adapted to removably receive in its tire inflation chamber a safety runflat insert. The wheel assembly also includes a safety vent for preventing inflation of the tire cavity in the event of improper assembly or disassembly of the safety tire and wheel assembly, including an O-ring seal disposed in a triangular cavity formed between opposing portions of rim segments of the wheel assembly, and mounting studs and associated nuts that releasably clamp the rim segments together with the O-ring captured in compression therebetween. The outboard wheel rim segment includes a wheel mounting disc and may also have a safety inflation valve coupling fixed to the outboard rim segment. An interior air passage of the coupling communicates with the tire cavity and has a minimum cross sectional dimension which prevents insertion therethrough an air inflation valve provided on an inner tube of sufficient size to fit within said tire cavity and capable when inflated of rendering said wheel and tire assembly normally operable for supporting its normal vehicle load in a run-mode of the vehicle.

11 Claims, 2 Drawing Sheets

SAFETY TIRE AND TAKE-APART WHEEL CONSTRUCTION

FIELD OF THE INVENTION

The present invention is directed to wheel assemblies for tubeless pneumatic tires of a type adapted for continued operation upon lowering or loss of air pressure in the tire, and more particularly to assemblies of the described type which include a safety insert device disposed internally of the tire tread for supporting the tire tread in the deflated condition. The invention also relates to take-apart safety wheel assemblies of the type having removable or separable flange rings for mounting or demounting of a tubeless pneumatic tire thereon and to structure for sealing and inflating such split-type wheels upon assembly of the rim and wheel parts after mounting the tire on the disassembled rim part, and vice-versa.

BACKGROUND OF THE INVENTION

It has long been the practice in the construction of wheels for trucks and other heavy duty highway or off-highway vehicular equipment, including military vehicles, to provide a "multi-piece" type or a "take-apart" type wheel assembly, each type utilizing a rim of the split-type in order to facilitate the mounting or demounting of heavy duty tubeless pneumatic tires thereon. In such multi-piece and take-apart wheels, it has also been conventional to employ a sealing member, such as an O-ring or other sealing ring having especially contoured cross-sectional configurations, which is interposed between the removable flange ring and the other disc and rim parts of the wheel to seal the tire and rim to maintain the necessary air tightness between them.

Take-apart wheels are an integral part of several systems designed to provide enhanced mobility for army pneumatic tire vehicles, such as the High Mobility Multi-Purpose Wheel Vehicle (HMMWV). Such wheels provide the ability to insert devices into the tire cavity for run-flat capability or bead lock to prevent tire bead unseating when operated at the low inflation pressure as necessary for soft soil floatation.

The difference between a "Take-apart" type wheel and the more common multi-piece, lock ring and gutter style of wheel is that the former is a bolt-together type of wheel. This allows repeated assembly/disassembly with common hand tools. It also provides a means of axially compressing the tire beads against a bead locking device which simulates inflation pressure sufficient to prevent bead unseating under low or no inflation pressure conditions.

In order to be able to insert either run-flat or bead lock devices into the tire cavity, the tire must be of the tubeless type. This requires the two rim halves of the take-apart wheel to be sealed to prevent air loss. Several seal types have been utilized experimentally, but the easiest and least expensive has been found to be the common O-ring type of seal. To meet the demand for army mobility requirements for varying tire inflation pressures, depending upon terrain conditions, vehicle manufacturers have developed Central Tire Inflation Systems (CTIS) which allow the crew to change the inflation pressure in a few minutes without leaving the vehicle cab. This is accomplished by an on-board compression valving and piping system with an on-dash control switch.

For further details regarding various facets of take-apart wheels for high mobility military applications, reference may be made to SAE Technical Paper No. 880694 entitled "Take-Apart Wheels for High Mobility Military Applications" by J. Bruce Weeks of Motor Wheel Corporation presented at the SAE International Congress and Exposition, Detroit, Mich. on Feb. 29--Mar. 4, 1988.

Examples of improvements in such prior art take-apart wheels with sealing members may be found in the following prior art U.S. Pat. Nos. assigned of record to the assignee herein, namely, Strader 4,327,791; Strader 4,481,997; Payne et al 4,823,854; and Weeks et al 4,836,261. These patents disclose take-apart military vehicle wheels employing O-ring sealing and adapted to be equipped with a safety insert device disposed internally of a tubeless tire mounted on the rim for supporting the tire tread in a deflated condition to thereby provide a so-called "run-flat" wheel construction.

In safety tire and wheel assemblies which include inserts of the described type, the insert conventionally comprises a base portion disposed adjacent the wheel rim and a second portion projecting radially from the rim into the tire cavity or chamber. Upon loss of air pressure in the chamber, the tire tread collapses against the second portion of the insert such that the insert supports the tire tread with respect to the rim for continued operation of the vehicle. Alternatively, the insert may comprise merely a base portion adapted to operate as a so-called "bead-lock" to prevent slippage of the tire beads relative to the rim bead seats and tire bead retaining flanges under high torque and/or low inflation pressure conditions, and/or to prevent loss of the tire from the rim under such conditions.

The aforementioned Strader '997 patent also discloses and claims an important safety feature useful in a multi-piece wheel rim assemblies, whether considered alone or in combination with safety inserts of the above-described type, which overcomes a significant safety hazard if it is attempted to inflate a tire mounted thereon when the various wheel assembly components are improperly positioned or seated, or to disassemble the rim when the tire mounted thereon has not been completely deflated. In the Strader '997 patent wheel construction, the disc and inboard rim part are made as one piece, and the O-ring is captured between a shoulder, at the junction of the disc with the inboard rim part, and an upturned flange at the inner edge of the outboard rim part. Safety vent means, such as a groove or aperture in the disc-inboard rim piece, is located on the outboard side of the seal when in assembled position. Such safety vent means is operative to prevent inflation of a tire mounted on a wheel assembly when the wheel assembly components are improperly positioned and/or to automatically vent the tire cavity to atmosphere prior to disconnection of the outboard rim part should disassembly be attempted when the tire mounted thereon is still fully or partially inflated.

In the aforementioned Weeks et al '261 patent such safety air bleed means comprises a shoulder radius on the disc between the central wheel mounting portion of the disc and the outer surface of the outer marginal flange of the disc. The O-ring seal is displaceable by a tire interior air pressure axially along the disc outer surface onto the disc shoulder radius to thereby lose sealing engagement with the sealing surfaces to allow complete tire deflation as the wheel assembly nuts are loosened but while still engaged with their associated threaded studs.

One safety problem remains with such wheels when made to heavy duty military specifications which has thus far prevented their use in non-military applications, namely, the relatively large diameter rim hole provided to mount the military-specified inflation valve hardware. This valve hole is large enough to permit insertion therethrough of the built-in inflation valve of an inner tube, enabling the same to be improperly utilized as a "field fix" to salvage or prolong the use of a damaged tubeless tire mounted on the wheel. Although this unsafe practice is not condoned in military usage, it must be prevented if such take-apart wheels are to be made and marketed for commercial usage in order to prevent the safety air bleed feature of take-apart wheels from being improperly defeated in the field by the aforementioned inner tube "fix".

More particularly, it is not uncommon in commercial applications that, when a tubeless tire is damaged, such as by a side wall cut, the vehicle operator or service mechanic will make a "field fix" by installing an inner tube in the otherwise tubeless pneumatic tire so that the tire can continue in service even though damaged. However, when this fix is employed with a take-apart wheel, a dangerous condition is thereby created because the inner tube inside the tire defeats the O-ring air escape safety feature described previously hereinabove. Since automatic deflation of the tubeless tire upon initial partial disassembly of the wheel is no longer assured, the outboard demountable disc and/or rim part can be forceably blown off the remaining wheel and tire parts during wheel disassembly by the bead expansion force of the inflated inner tube, thereby creating a potential hazard which may cause injury to person and property. In other words, if an inner tube is installed in a tubeless tire on such a wheel, there is no safety air escape to deflate an inflated inner tube and hence, if not properly fully deflated, its expansion force can cause the wheel to fly apart during disassembly even though the interior tire cavity may be safety vented to atmosphere.

The aforementioned "inner tube fix" is not considered a problem in military applications because it is not military practice to repair damaged tubeless tires by inserting inner tubes in the same, but rather to proceed with 100% replacement of damaged tubeless tires with new, undamaged tubeless tires. Moreover, in military applications in which the take apart wheel is equipped with a run-flat insert 90 or the like, the tire/wheel assembly can be run deflated until the tire is replaced.

Thus, although the aforementioned safety wheel and run-flat wheel constructions have been successfully built and tested for use on military vehicles, certain problems nevertheless remain, such as the aforementioned lack of safe convertibility of a military specified design to non-military heavy duty truck use for the commercial on-highway and off-highway markets, as well as the continuing need to improve the rim-to-brake clearance for a given wheel size, the desirability of employing a standardized disc for various rim parts having thicknesses differing from the disc, and vice versa, while retaining the ability to accommodate a variety of wheel offsets from a standard set of component parts. Moreover, it is desirable from the manufacturing cost standpoint that the above parameters be satisfied in a wheel construction which can be made on existing conventional stamping equipment with respect to the disc, and wherein the rim parts can be made on conventional roll forming or die stamping equipment so that spin forming equipment operations need not be utilized in the manufacture of the wheel, and so that the two-part wheel subassembly can be made on conventional and existing rim-disc press fit and welding equipment.

Another type of take-apart wheel construction employs a one-piece wheel disc integral with an outboard tire bead seat portion and outboard tire bead retaining flange, which is removably secured by bolts to an inboard rim part comprising a inboard tire bead retaining flange, rim bottom portion, usually of cylindrical configuration, and a radially in-turned mounting flange. Examples of this type of take-apart wheel construction may be found in the following U.S. Pat. Nos.:

| | |
|---|---|
| Mitchell | 3,865,170 |
| Mitchell | 3,885,615 |
| Sano | 4,106,543 |
| Osada et al | 4,216,810 |
| Okada | 4,228,840 |
| Osada et al | 4,372,365 |

However, none of such prior art proposals would appear to provide a safety tire and take-apart wheel construction which would fulfill all of the stated objects of the present invention nor provide the features and advantages of the same.

Accordingly an object of the present invention is to provide an improved take-apart wheel rim assembly utilizing a tubeless pneumatic tire, and having a safety vent feature, which overcomes the aforementioned problems present in such wheel constructions, optimizes the aforementioned desirable product design and manufacturing parameters and which is safely usable in either military or commercial applications.

BRIEF DESCRIPTION OF THE DRAWINGS

The invention, together with additional objects, features and advantages thereof, will be best understood from the following detailed description, the appended claims and the accompanying scaled drawings, in which:

DETAILED DESCRIPTION OF PREFERRED EMBODIMENTS

In the following description and claims, directional adjectives such as "inboard" and "outboard" are taken with reference to a preferred orientation of mounting of the wheel, etc., on a vehicle, and no undue limitations should be inferred therefrom where such directional adjectives are not essential to operation of the structural and functional features of the invention.

Figure 1:
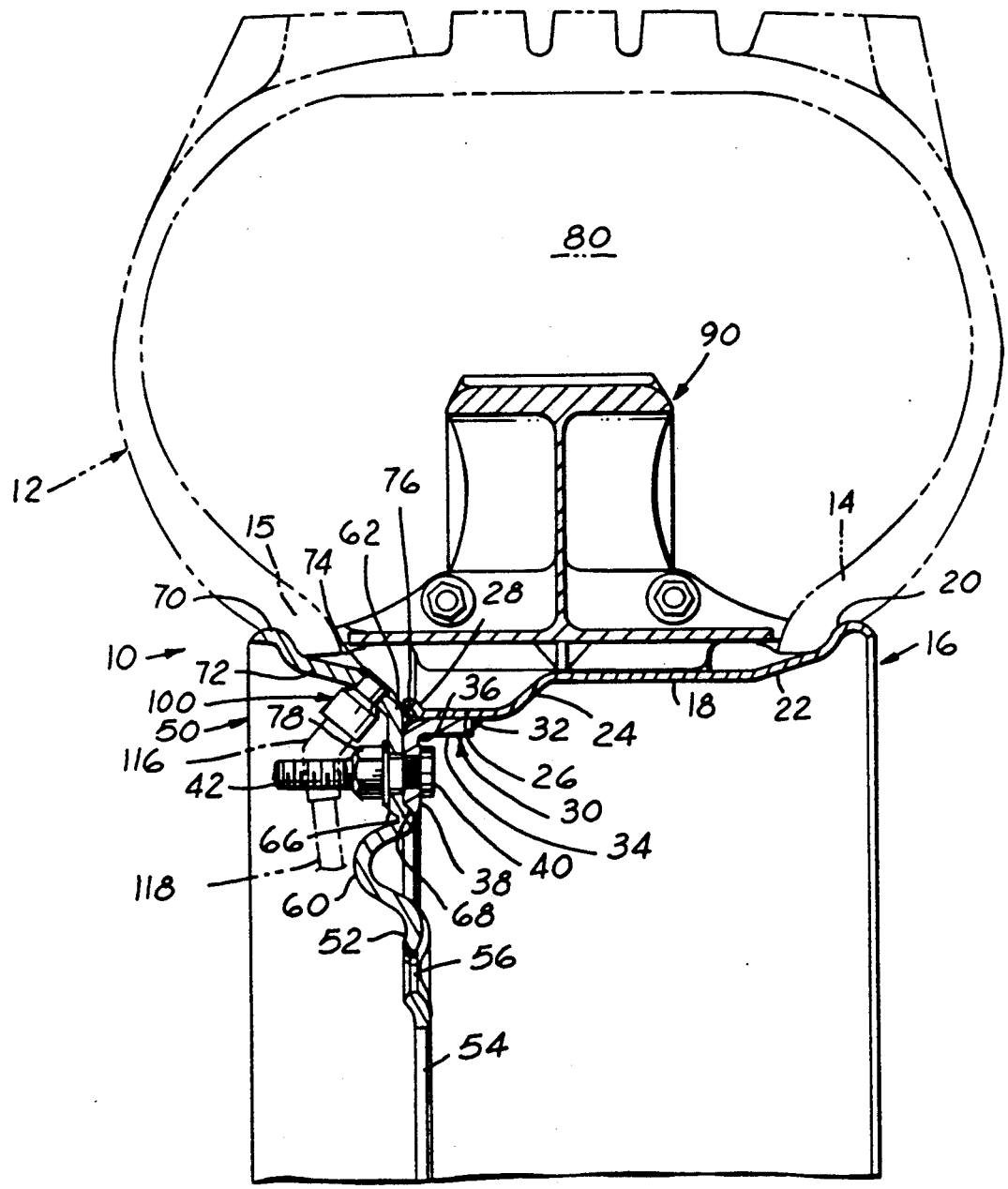
FIG. 1 is a fragmentary sectional view, taken on the line 1—1 of FIG. 2, of a presently preferred embodiment of the wheel assembly of the present invention, the parts being illustrated in fully assembled relationship with a run-flat insert and a tubeless pneumatic tire (shown in phantom) mounted on the wheel assembly.
Figure 2:
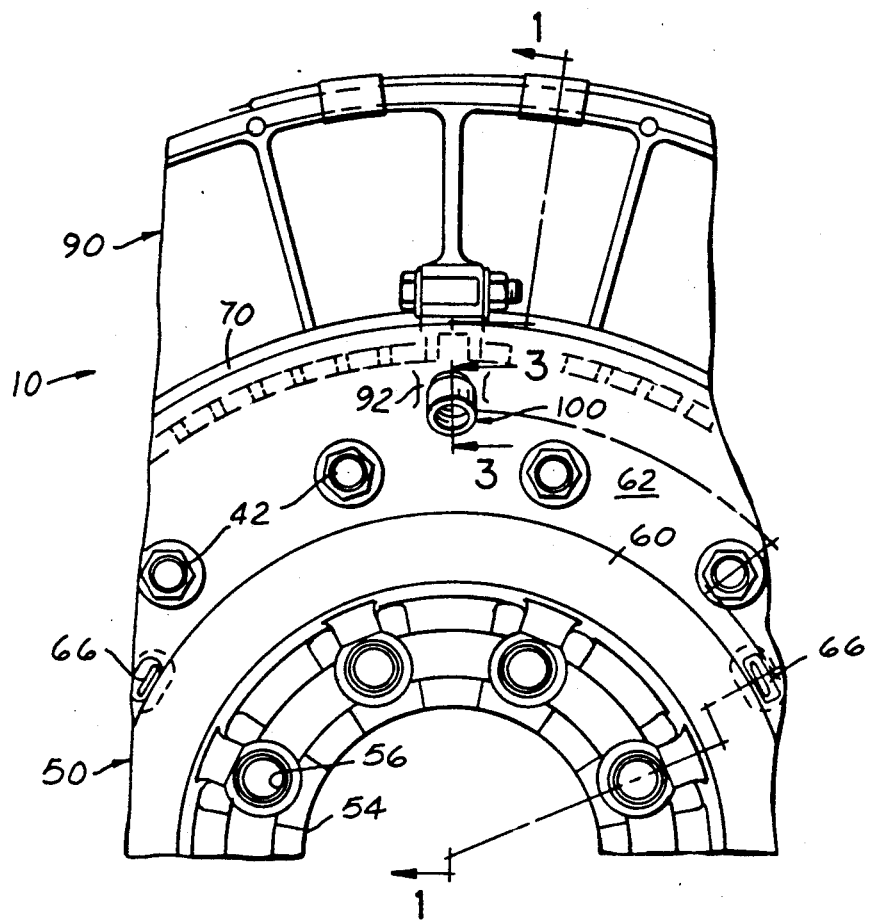
FIG. 2 is a fragmentary side elevational view of the wheel assembly of FIG. 1 without a showing of a tire thereon.
Figure 3:
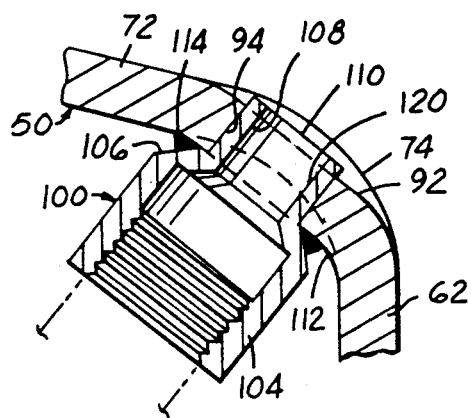
FIG. 3 is a fragmentary enlarged cross-sectional view taken on the line 3—3 of FIG. 2, of one embodiment of a tire inflation valve safety mounting structure of the invention.

FIGS. 1-3 illustrate a presently preferred embodiment of a take-apart safety tire and wheel assembly in accordance with the present invention as comprising a wheel assembly 10 and a tubeless pneumatic tire 12 (shown in phantom in FIG. 1) mounted by its inboard and outboard tire beads 14 and 15 on wheel 10. Wheel assembly 10 includes an inner rim part 16 having a cylindrical rim base 18 and an inboard bead retaining flange 20 integrally projecting radially outwardly therefrom and coupled thereto by a 15° bead seat 22. An outboard portion of inner rim part 16 is rolled form to provide a relatively small drop well comprising an inclined frusto conical shoulder 24 extending from base 18 radially inwardly to a reduced diameter cylindrical portion 26. The outboard free edge of rim part 16 comprises a lip portion 28 which is curled radially outwardly from portion 26 so as to present a slightly concave surface on its radially inner side.

A mounting ring 30, which is generally L-shaped in radial cross section, is permanently affixed to inner rim part 16 by a circumferential weld 32 at the junction of an inboard edge of a cylindrical flange 34 of ring 30 with the inner periphery of rim well portion 26. Flange 34 is designed to telescope with a press fit against the inside of rim well portion 26. Ring 30 has a relatively large radius corner portion 36 joining flange 34 to a radially inwardly extending flange 38. Flange 38 is convexly contoured toward the inboard side of the wheel and has a row of stud holes which individually receive a series of mounting bolts 40 arranged with their heads inboard. Each bolt 40 has a spline section press fit into the associated bolt hole and also has threaded shank 42 which protrudes axially outboard of ring 30 a predetermined distance.

Wheel assembly 10 further includes an outer rim and disc part 50 comprising a disc bolt circle portion 52 with a center pilot opening 54 formed therein and a circular row of bolt holes 56, wheel mounting studs (not shown) being individually insertable through holes 56 for mounting wheel assembly 10 on a vehicle in the usual manner. The portion of part 50 radially outwardly of bolt circle portion 52 has an annular hat section 60 which blends into a radially extending circular portion 62. A circular row of stud openings are formed in disc portion 62 for individually receiving wheel assembly studs 40 therethrough. A series of three equally angularly spaced, axially inboard struck, locating projections 66 are formed at the junction of hat section 60 with portion 62 (FIGS. 1 and 2), and the inclined inner edge 68 of flange 38 is adapted to seat upon projections 66 for locating inboard and outboard parts 16 and 50 relative to one another during assembly.

Outboard disc/rim part 50 has an outboard rim portion comprising a outboard tire bead retaining flange 70, an outboard tire bead seat portion 72 (also inclined at 15° relative to the wheel axis) and a curved portion 74 merging integrally with portion 62 of the disc.

An O-ring seal 76 is received in the generally triangular cavity defined (in radial cross section) between lip 28, curved shoulder 36 and disc circular portion 62. Seal 76 is axially squeezed between the three circumferentially continuous annular sealing surfaces defining this cavity when nuts 78, threadably received on shanks 42, are tightened against the outboard face of circular disc portion 62, thereby sealing the interior air cavity 80 of tire 12 against leakage through the wheel assembly 10. O-ring 74 is dimensioned such that in its free state it is readily inserted into the open annular groove defined between rim lip 28 and flange shoulder 36 prior to assembly of outer disc-rim part 50 onto part 16. Tightening nuts 78 forces disc portion 62 into fully assembled condition and thereby compresses O-ring 74 further into the aforementioned triangular cavity.

It now will be readily understood from the foregoing that O-ring 76, when inserted into the open annular groove defined between rim lip 28 and flange shoulder 36, and prior to assembly of outer disc-rim part 50 onto part 16, protrudes axially a short distance in an outboard direction from the radial plane defined by the outboardmost surfaces of lip 28 and flange 38.

Hence when the radially extending planar inboard surface of disc portion 62 (which forms the third sealing surface defining the aforementioned triangular cavity) is brought into flatwise and sealable engagement with O-ring 76, the amount of squeezure of the O-ring, developed during compression thereof by tightening of nuts 78 to force disc portion 62 axially of the wheel into fully assembled condition, may vary slightly without thereby impairing the air-sealing capability of O-ring 76 in the triangular sealing cavity. This deformable protrusion of O-ring 76 thus can advantageously accommodate a small range of dimensional variations and manufacturing tolerance stack-ups which may be customarily encountered in the tire bead toes 14 and 15, the rim base part 16 and disc-rim part 50, as well as in the run-flat safety insert 90 or other bead lock insert constructions (in a direction axially of the wheel) if employed in the tire and wheel assembly of the invention.

As set forth in the aforementioned Strader U.S. Pat. No. 4,481,997 and in the Weeks et al U.S. Pat. No. 4,836,261, wheel assembly 10 is provided with a safety vent feature for exhausting air from tire cavity 80 radially inwardly of the wheel assembly in the event wheel disassembly is attempted in a non-fully deflated condition of tire 12. In the disclosed embodiment of FIGS. 1 and 2, if tire 12 remains fully or partially inflated, as the assembly nuts 78 are removed the outboard rim disc part 50 will flex axially outwardly, as well as axially bodily separate, from inboard part 16, allowing O-ring 76 to be forced by the air pressure over the outer periphery of the shoulder 36. Simultaneously, the compression stress on the O-ring is relieved by movement of disc portion 62 axially outboard (to the left as viewed in FIG. 1) as the nuts are being loosened. At a given stage of separation during this nut loosening process, the air will exhaust quickly from the interior of the tire. The length of bolt shanks 42 is sufficient to insure nut retention thereon during the loosening process, thereby enabling sufficient separation of part 50 from part 16 to insure complete depressurization of tire cavity 80 while sufficient threads extend outboard of nuts 78 to continue holding part 50 to parts 16/30.

Wheel assembly 10 is adapted to receive a run-flat safety insert 90 carried by wheel assembly 10 internally of tire 12 for supporting the latter in the event of tire deflation. Insert 90 is constructed similar to safety insert 16 of the aforementioned Strader '791 patent, or insert 14 of the aforementioned Strader '997 patent, and also performs a bead lock function in assembly with tire 12 and wheel 10. Alternatively, the safety insert may be constructed in accordance with the aforementioned Payne et al '854 patent. In any event, the safety insert 90 is shown herein merely by way of background and does not form part of the present invention. As indicated previously, such a safety insert has hitherto been provided to enable run-flat operation for military applications of wheel 10.

In order to meet military specifications with the aforementioned HMMWV military vehicle a relatively large diameter air inflation opening must be provided to communicate a source of compressed air located exteriorly of the wheel assembly via inflation valve structure with the interior tire cavity 80 for tire inflation purposes and for venting of the tire cavity for tire deflation. Accordingly, an outboard projecting flat portion 92 is die struck in the curved portion 74 of part 50, as best seen in FIGS. 2 and 3. A cylindrical opening 94 is drilled or punched through this portion so as to have a nominal inside diameter of 0.450 inches in order to accommodate the military specified standard air inflation valve structure (not shown) fixedly mounted with its stem inserted in opening 102.

Wheel assembly 10 as thus far described is well suited to meet the requirements of military take-apart wheels for high mobility military vehicles in accordance with several objects of the invention. Among the features of wheel 10 as thus far described are the provision of the outboard combined disc and rim part 50 which, as configured and constructed as previously described and shown in the drawings, is particularly well adapted for manufacture by an efficient stamping process from sheet or plate steel in conventional, already-existing stamping equipment. Likewise, mounting ring 30 is readily made as a sheet metal stamping. The three pilots 66 are likewise readily die struck in part 50 to precise dimension. The inboard rim part 16 may be made of thinner section sheet metal and roll formed in standard wheel rim forming equipment. This part may also be made with different axial lengths to accommodate different axial off-sets while parts 30 and 50 are kept standardized.

Due to the location of the air inflation opening 94 in the outboard part 50, exteriorly mounted tire inflation valve structure, instead of interiorly mounted tire inflation structure, such as the turret valves 24 of the aforementioned Weeks et al patent '261, may be utilized. Hence, greater clearance is provided interiorly of inboard rim part 16 for associated wheel brake structure. Moreover, the take-apart wheel safety venting structure of the aforementioned Strader '997 patent and/or Weeks et al '261 patent is retained. If desired, the air venting grooves, knurled indentations and/or drilled passages of these patents may be provided in mounting ring 30 to operate in the manner of the aforementioned patents.

The generally V-shaped circular cavity defined by rim lip 28 and shoulder 36 of ring 30 provides a convenient outboard facing trench in which to loosely insert O-ring 76 by hand, a slight press-in finger force being sufficient to temporarily retain O-ring 76 in this cavity if the wheel is being assembled with its axis horizontal. If assembly of wheel 10, insert 90 and tire 12, is performed with the inboard edge of part 16 resting on a horizontal surface, and with the O-ring receiving groove facing upwardly (wheel axis vertically oriented), the O-ring 76 may be merely dropped into proper location, ready for assembly of part 50 against ring 30. Since wheel assembly 10 constitutes a three-piece assembly (parts 16, 30 and 50) as contrasted with the four part assembly of the aforementioned Weeks et al '261 patent (parts 16, 40, 80 and 100 therein), it is less costly to manufacture and assemble.

In accordance with another feature of the present invention, wheel 10 is provided with special tire inflation valve mounting structure which meets the military specifications indicated previously, and which also renders wheel assembly 10 safe for use in commercial heavy duty truck on-highway and off-highway vehicle applications. As best seen in FIGS. 1, 2 and 3, a special fitting 100 provided in accordance with the present invention which, in the embodiment of FIG. 3, is a conventional tapered pipe thread connector properly sized for this particular application. Connector 100 has a cylindrical body portion 104, a frusto conical tapering neck portion 106 and a cylindrical sleeve portion 108. The outside diameter of sleeve 108 is dimensioned for a close sliding fit in disc hole 94. The axial dimension of sleeve 108 is selected such that the inner end 110 of sleeve 108 protrudes inwardly of disc 50 slightly beyond the inboard surface of flat 92 but not beyond the radius of shoulder 74 when the shoulder of neck 106 abuts the outer surface 112 of flat 92. A continuous circumferential MIG weld 114 is employed to permanently affix connector 100 to disc 50 and to seal against air leakage. The interior of connector body 104 is suitably threaded and otherwise adapted for coupling to a conventional tubing connector 116 (indicated in phantom in FIG. 1), which in turn is coupled to a tubular compressed air supply line 118 (FIG. 1) communicating with the on-board central tire inflation system of the military vehicle.

It is to be particularly noted that the cylindrical inner periphery 120 of connector sleeve 108 has an inside diameter in the order of 0.250 inches to provide, on the one hand, a relatively unrestricted passage for admitting compressed air for inflating tire 12, and for exhausting compressed air from tire cavity 80 for deflating tire 12, but on the other hand, small enough to preclude passage therethrough of even the smallest-size tire inflation valve customarily provided on an inner tube of sufficient size for use in tire 12 (see wheel and tire specifications hereinafter). Such inner tube valves have been found to have a minimum outside diameter of at least 0.305 inches with respect to inner tubes sizes for the embodiment of the wheel assembly and tire illustrated in FIGS. 1 through 3. Hence, the safety fitting 100 of the present invention effectively prevents the installation of an inner tube in tubeless tire 12. However, as indicated previously, in the absence of safety connector 100, such a 0.305 inch diameter inner tube valve stem can be inserted through the disc hole 94, which could thus permit improper installation and use of an inner tube in tire 12 and thereby create an unsafe condition in a take-apart wheel.

Figure 4:
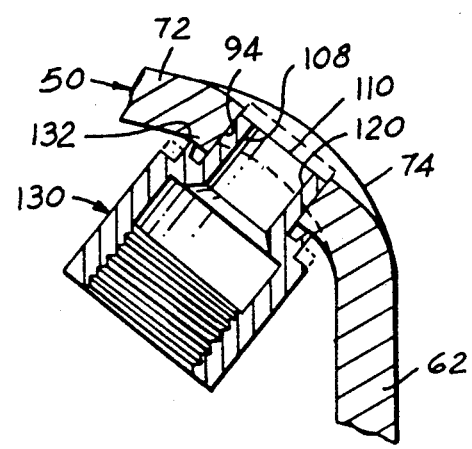
FIG. 4 is a fragmentary enlarged cross sectional view of another embodiment of a tire inflation valve safety mounting structure of the invention.

Referring to the alternative embodiment of FIG. 4, a modified safety connector 130 is illustrated which is similar to connector 100 with respect to the neck sleeve 108 and its exterior and safety interior dimensional relationship as described in conjunction with connector 100. However, connector 130 is designed with a circular weld projection 132 in its shoulder area to adapt connector 130 to be projection welded to disc 50. The interior of connector 130 may be adapted as desired for connection to standard inflation valves and thus, for example, may have a ¼ inch National Pipe Thread (NPT) for this purpose.

From the foregoing description it will now be understood that take-apart wheel assembly 10 of the present invention provides not only the several advantages previously mentioned, but also a safety take-apart wheel construction of universal application, i.e., one which can be safety utilized on commercial heavy duty on-highway and off-highway vehicles as well on military vehicles. By thus greatly expanding the potential market for take-apart wheels hitherto made only for the military market, significant cost reductions can be obtained because of higher volume mass production. Such cost reductions, by at least partially off-setting the added cost of a run-flat insert 90 or the like, in turn makes it more economically feasible to employ run-flat take-apart wheel assemblies in commercial applications which in turn offers substantial savings in operation and greatly improved safety in the commercial field.

By way of example rather than by way of limitation, one successful embodiment of an improved safety take-apart wheel construction 10 constructed in accordance with the present disclosure employed the following specifications and parameters:

| | |
|---|---|
| Tire 12 | 36x 12.5–16.5 bias tire |
| Bead seat diameter of wheel 10 | 16.5 inches |
| Bead seat width with wheel 10 | 08.25 inches |
| Axial offset of inner mounting plane of disc portion 52 relative to wheel center line | 2.125 inches |
| Bolt hole circle diameter | 6.5 inches |
| Number of flanged hex nuts 78 | 12 |
| Torque tension applied to nuts 78 before tire inflation | 125 ft.-lb. |
| Average finished stock thickness of outboard part 50 | 0.230 inches |
| Average finished stock thickness of mounting ring 30 | 0.205 inches |
| Average stock thickness of inner rim part 16 | 0.135 inches |
| Material of parts 16, 30 and 50 | steel |

It is also to be understood that, although the foregoing description and drawings describe and illustrate in detail successful working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

I claim:

1. A wheel rim and disc assembly for use in a safety tire and wheel assembly which includes a pneumatic tubeless tire, said wheel rim and disc assembly comprising:
   an inboard rim part including a rim base and an inboard tire bead retaining flange integrally carried at an inboard edge of said rim part, said inboard rim part having a generally cylindrical band terminating at an outboard free edge of said rim base remote from said inboard flange of said inboard rim part,
   a wheel mounting ring having an outer marginal axially extending flange telescoped into and secured to said cylindrical band, said ring having a radially inwardly extending flange having an outer surface extending generally co-planar with said inboard rim part free edge,
   a demountable outboard rim part comprising a central wheel mounting portion and an outboard tire bead retaining flange integrally projecting from an outboard edge of said wheel mounting portion,
   annular resilient sealing means disposed between an outboard first sealing surface of said wheel mounting ring, an inboard second sealing surface of said outboard rim part and a radially inwardly facing third sealing surface of said rim base band free edge of said inboard rim part,
   and means for axially clamping said outboard rim part on said inboard rim part with said sealing means being captured in compression between said aforementioned three sealing surfaces so as to seal against air leakage from the internal cavity of a tire mounted on said wheel rim and disc assembly,
   said wheel rim and disc assembly having air bleed means normally sealed from the tire cavity by said sealing means, said clamping means being constructed and adapted to engage and exert clamping stress on said outboard rim part over a range of relative movement therebetween in the axial direction of said inboard rim part which is sufficient to permit loss of sealing pressure at said sealing means prior to loss of clamping engaging at said clamping means to thereby permit air leakage past said sealing means through said air bleed means to atmosphere within said range of relative movement,
   said first, second and third sealing surfaces when juxtaposed to sealably compress said sealing means thereby defining an annular cavity which in radial cross-section generally defines a triangle, said sealing means being bodily movable along said mounting ring first cavity air pressure upon mutual separation of said second sealing surface of said outboard rim part from said mounting ring and inboard rim part third sealing surface in response to said relative separational movement of said rim parts.

2. The wheel rim assembly as set forth in claim 1 wherein said ring outer marginal flange is press fit into said cylindrical band of said inboard rim part and secured thereto a circumferential weld at the junction of an axially inboard edge of said ring marginal flange and the juxtaposed adjacent inner surface of said cylindrical band of said inboard rim part.

3. The wheel rim assembly as set forth in claim 1 wherein said outboard and inboard rim parts are cooperable to permit air leakage from the tire internal cavity past said sealing means through said air bleed means to atmosphere upon improper mounting of said demountable outboard rim part on said inboard rim part.

4. The wheel rim assembly as set forth in claim 1 wherein said clamping means comprises first threaded means carried by said mounting ring and means coupled to said outboard rim part including second threaded means adapted to be threadably received by said first threaded means, said first and second threaded means being dimensioned in the axial direction of said rim base means sufficiently to permit said loss of sealing engagement at said sealing means prior to loss of threaded engagement at said threaded means upon loosening of said threaded means.

5. The wheel assembly as set forth in claim 4 wherein said rim base and inboard tire bead retaining flange have a uniform stock thickness less than the stock thickness of said outboard rim part.

6. The wheel assembly as set forth in claim 5 wherein said cylindrical hoop of said inboard rim part has a sliding fit as telescopically received onto said outer marginal flange of said mounting ring.

7. The wheel rim assembly set forth in claim 4 wherein said first threaded means comprises a plurality of threaded studs affixed in a circumferential array to said mounting ring, and wherein said second threaded means comprises a plurality of nuts received onto said studs, the threaded length of said studs being such as to permit loss of sealing at said sealing means before said nuts are removed from said studs.

8. The wheel rim assembly as set forth in claim 4 wherein said air bleed means comprises an external shoulder radius on said mounting ring radially juxtaposed to said third sealing surface of said inboard rim part, said annular resilient means being displaceable by tire interior air pressure axially along said ring outer surface onto said ring shoulder radius to thereby lose sealing engagement with said sealing surfaces as said threaded means are loosened but still interengaged and thereby allow flexure and/or warpage of said demountable outboard rim part in response to tire bead lateral expansion forces exerted by the tire interior cavity air pressure.

9. The wheel rim assembly as set forth in claim 8 wherein said respective mounting ring and inboard rim part first and third sealing surfaces are each inclined radially in opposite directions relative to the rotational axis of said wheel rim and disc assembly in divergent relationship to one another and said second sealing surface of said outboard rim part extends generally radially of said assembly such that the three of said sealing surfaces thereby define an annular cavity which in radial cross-section defines a generally equilateral triangle.

10. The wheel rim assembly set forth in claim 9 wherein said second sealing surface defines a radially extending planar surface for abutting flatwise and sealably engaging said sealing means, said sealing means protruding axially in an outboard direction from said rim base means for resiliently accommodating dimensional variations in said tire bead toes, rim base means and demountable flange means.

11. A take-apart safety tire and wheel assembly comprising the wheel rim assembly as set forth in claim 10 and further including in combination therewith a pneumatic tubeless tire having axially spaced bead toes and a circumferential tire treads spaced radially outwardly of said rim base to define a tire inflation chamber cavity, and a safety run-flat insert means removably received in said tire inflation chamber cavity, said run-flat insert means including an axially incompressible first portion extending circumferentially around said rim base and having axially spaced side edges in clamping engagement with said tire bead toes and forcing the same against said tire bead retaining flanges of said inboard and outboard rim parts.

* * * * *